UNITED STATES PATENT OFFICE.

FRANCES J. COBURN AND ELLEN M. DEAN, OF DENVER, COLORADO.

COMPOSITION OF MATTER TO BE USED FOR JOURNAL-BOXES.

SPECIFICATION forming part of Letters Patent No. 350,911, dated October 19, 1886.

Application filed October 1, 1885. Renewed September 9, 1886. Serial No. 213,174. (No specimens.)

*To all whom it may concern:*

Be it known that we, FRANCES J. COBURN and ELLEN M. DEAN, citizens of the United States, residing at Denver, in the county of Arapahoe and State of Colorado, have invented a new and useful Composition of Matter to be Used for Journal-Boxes, of which the following is a specification.

Our composition consists of the following ingredients, combined in about the proportions stated, viz: asbestus, ten parts; plumbago, fifteen parts; mica, ten parts; talc, five parts; soapstone, five parts; carbonate of soda, one part; litharge, two parts; mineral magnesia, seven parts.

In preparing the above compound we powder all the ingredients (excepting the soda and litharge) by first heating and then putting them into cold water separately, or in any other way whereby we can reduce them to an impalpable powder. Then we dry the same and mix thoroughly all of the above-named ingredients, after which we mold the same under pressure, adding a little shellac or glue, or their equivalents, mixed with acetic acid, and bake under a sufficient degree of heat to make the journal-boxes solid and lasting. We also in some cases make one or more openings or perforations in said journal-boxes, so as to admit of a circulation of air through the journal-boxes to the axle or spindle run in the journal-box.

We are aware that Letters Patent No. 310,827 were issued to John H. Wingate, of Denver, Colorado, for a certain composition for journal-boxes, and we are also aware that the ingredients therein named and specified do not make a perfect chemical combination, such as to produce a hard, solid, and durable journal-box.

What we do claim, and desire to secure by Letters Patent of the United States, is—

1. The composition for journal-boxes herein described, consisting of asbestus, plumbago, mica, talc, soapstone, carbonate of soda, litharge, mineral magnesia, and a cementing-substance, substantially as described, and in about the proportions mentioned.

2. The journal-boxes herein described, consisting of asbestus, plumbago, mica, talc, soapstone, carbonate of soda, litharge, mineral magnesia, and a cementing substance, properly mixed, pressed into shape, and then baked, as set forth.

FRANCES J. COBURN.
ELLEN M. DEAN.

Witnesses:
GEORGE CANFIELD,
G. L. CANNON.